United States Patent [19]

Kreuder et al.

[11] Patent Number: 5,763,636
[45] Date of Patent: Jun. 9, 1998

[54] POLYMERS CONTAINING SPIRO ATOMS AND METHODS OF USING THE SAME AS ELECTROLUMINESCENCE MATERIALS

[75] Inventors: Willi Kreuder, Mainz; Hubert Spreitzer, Frankfurt, both of Germany

[73] Assignee: Hoechst Aktiengesellschaft, Frankfurt, Germany

[21] Appl. No.: 813,020

[22] Filed: Mar. 4, 1997

Related U.S. Application Data

[63] Continuation-in-part of Ser. No. 541,237, Oct. 12, 1995, Pat. No. 5,621,131.

[30] Foreign Application Priority Data

Apr. 17, 1996 [DE] Germany ............... 196 14 971.1

[51] Int. Cl.$^6$ ............... C07C 22/00; C08G 59/00
[52] U.S. Cl. ............... 528/46; 528/403; 528/405; 528/406; 528/408; 528/420; 528/423; 528/425; 558/46; 427/385.5; 428/221; 428/704; 428/917
[58] Field of Search ............... 528/403, 405, 528/406, 408, 420, 423, 425; 558/46; 427/385.5; 428/221, 704, 917

[56] References Cited

U.S. PATENT DOCUMENTS

| | | |
|---|---|---|
| 3,172,862 | 3/1965 | Gurnee et al. |
| 5,026,894 | 6/1991 | Tour et al. |
| 5,621,131 | 4/1997 | Kreuder et al. ............... 558/46 |

FOREIGN PATENT DOCUMENTS

| | | |
|---|---|---|
| 0 443 861 | 8/1991 | European Pat. Off. |
| 0 676 461 | 10/1995 | European Pat. Off. |
| 0676461 | 10/1995 | European Pat. Off. |
| 0707020 | 4/1996 | European Pat. Off. |
| 90/13148 | 11/1990 | WIPO |

OTHER PUBLICATIONS

J.M. Tour et al., J. Am. Chem. Soc., vol. 112 (1990), pp. 5662–5663.
J.M. Tour et al., J. Am. Chem. Soc., vol. 113 (1991), pp. 7064–7066.
J.M. Tour et al., J. Am. Chem. Soc. (1990), pp. 408–409.

*Primary Examiner*—Samuel A. Acquah
*Attorney, Agent, or Firm*—Frommer Lawrence & Haug LLP

[57] ABSTRACT

Polymers containing spiro atoms which can be used as electroluminescence materials, suitable for use in ligerting or display devices, and which improve the property profile of these devices. Specifically, a conjugated polymer comprising structural units of the formula (I),

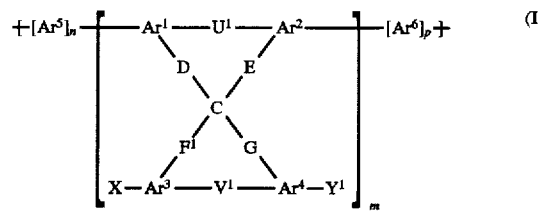

where the symbols and indices have the following meanings:
D, E, F$^1$, G are identical or different, and are —CR$^1$R$^1$—, —O—, —S—, —NR$^3$— or a chemical bond;
Ar$^1$, Ar$^2$ are carbocycles or heterocycles;
U$^1$, V$^1$ are identical or different, and are —CR$^5$=CR$^6$—, —CR$^7$R$^8$—, —CR$^9$R$^{10}$—CR$^{11}$R$^{12}$—, —NR$^{13}$—, —SiR$^{14}$R$^{15}$—, —O—, —S—, —SO—, —SO$_2$—, —CO— or a chemical bond;
Ar$^5$, Ar$^6$, X, Y$^1$ are identical or different, and are cyclic or acyclic, conjugated hydrocarbons and X and/or y$^1$ can also be H or R$^1$;
m is 1, 2, 3 or 4;
n, p are identical or different and are 0, 1, 2, 3 or 4, is suitable as an electroluminescence material.

20 Claims, No Drawings

POLYMERS CONTAINING SPIRO ATOMS AND METHODS OF USING THE SAME AS ELECTROLUMINESCENCE MATERIALS

RELATED APPLICATION

This is a Continuation-in-Part-Application of Serial No. 08/541,237, filed Oct. 12, 1995, allowed U.S. Pat. No. 5,621,131 hereby incorporated by reference.

This application claims priority to German Application No. 19 614 971.1, filed Apr. 17, 1997, incorporated herein by reference.

BACKGROUND OF THE INVENTION

1. Field of the Invention

The invention relates to electroluminescence materials suitable for use in lighting or display devices and methods of using the same.

2. Description of the Related Art

Several publications are referenced in this application. These references describe the state of the art to which this invention pertains, and are incorporated herein by reference.

There is a great industrial need for large-area solid-state light sources for a series of applications, predominantly in the field of display elements, VDU technology and lighting engineering. The demands made of these light sources can at present not be fully satisfactorily solved by any of the existing technologies.

As an alternative to conventional display and lighting elements such as incandescent lamps, gas discharge lamps and non-selfilluminating liquid crystal display elements, use has been made for some time of electroluminescence (EL) materials and devices such as light-emitting diodes (LEDs).

Apart from inorganic electroluminiscence materials, low molecular weight organic electroluminescence materials and devices have also been known for about 30 years (see, for example US-A-3,172,862). However, until recently such devices have been greatly restricted in their practical usability.

Patent Publications WO 90/13148 and EP-A 0 443 861 describe electroluminescence devices comprising a film of a conjugated polymer as light-emitting layer (semiconductor layer). Such devices offer numerous advantages such as the opportunity to produce large-area, flexible displays simply and inexpensively. In contrast to liquid crystal displays, electroluminescence displays are self-illuminating and therefore require no additional backwards lighting source.

A typical device according to WO 90/13148 comprises a light-emitting layer in the form of a thin, dense polymer film (semiconductor layer) comprising at least one conjugated polymer. A first contact layer is in contact with a first surface, a second contact layer with a further surface of the semiconductor layer. The polymer film of the semiconductor layer has a sufficiently low concentration of extrinsic charge carriers for charge carriers to be introduced into the semiconductor layer on application of an electric field between the two contact layers, with the one contact layer becoming positive relative to the other and the semiconductor layer emitting radiation. The polymers used in such devices are conjugated. A conjugated polymer is a polymer having a delocalized electron system along the main chain. The delocalized electron system gives the polymer semiconducting properties and enables it to transport positive and/or negative charge carriers with high mobility.

In WO 90/13148, poly(p-phenylenevinylene) is used as polymer material for the light-emitting layer, and it is proposed that the phenyl group in such a material be replaced by a heterocyclic or a condensed carbocyclic ring system. In addition, poly(p-phenylene), PPP, is also used as an electroluminescent material.

Although good results have been obtained with these materials, the color purity, is unsatisfactory. Furthermore, it is-virtually impossible to produce a blue or white emission using the polymers known hitherto.

Since, in addition, the development of electroluminescence materials, particularly those on the basis of polymers, cannot yet be regarded in any way as being concluded, the manufacturers of lighting and display devices are interested in a wide variety of electroluminescence materials for such devices.

This is because, inter alia, only the interaction of the electroluminescence materials with the further components of the devices enables conclusions to be drawn as to the quality of the electroluminescence material too.

SUMMARY OF THE INVENTION

The present invention relates to new electroluminescence materials which are suitable for use in lighting or display devices, and which improve the property profile of these devices.

It surprisingly has been found that certain conjugated polymers containing a plurality of spiro centers are particularly suitable as electroluminescence materials.

The invention accordingly provides conjugated polymers comprising structural units of the formula (I)

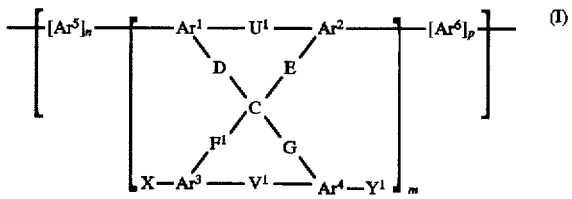

where the symbols and indices have the following meanings:

D, E, $F^1$, G are identical or different and are —$CR^1R^1$—, —O—, —S—, —$NR^3$—or a chemical bond;

$Ar^1$, Ar2 are identical or different and are benzenetriyl, thiophenetriyl, furantriyl, pyrroletriyl, pyridinetriyl, pyrimidinetriyl, pyrazinetriyl or pyridazinetriyl, where each of these groups can, independently of one another, be substituted by from 1 to 3, preferably 1, identical or different radicals $R^4$;

$Ar^3$, $Ar^4$ are identical or different and are as defined for $Ar^1$, Ar2 or are cyclohexanetriyl, cyclopentanetriyl, cyclohexenetriyl or cyclopentenetriyl, where each of these groups can, independently of one another, be substituted by from 1 to 3 identical or different radicals $R^4$;

$U^1$, $V^1$ are identical or different and are —$CR^5$=$CR^6$—, —$CR^7R^8$—, —$CR^9R^{10}$—$CR^{11}R^{12}$—, —$NR^{13}$—, —$SiR^{14}R^{15}$—, —O—, —S—, —So—, $SO_2$—, —CO— or a chemical bond;

$Ar^5$, $Ar^6$, X, $y^1$ are identical or different cyclic or acyclic, conjugated hydrocarbons having from 2 to 100, preferably from 2 to 20, carbon atoms, which can also contain heteroatoms, preferably O, N and/or S, and which can be substituted by one or more radicals $R^4$; X and/or $y^1$ can also be, identical or different, H or $R^1$;

$R^1$, $R^2$, $R^5$, $R^6$, $R^7$, $R^8$, $R^9$, $R^{10}$, $R^1$ 1, $R^{12}$ are identical or different and are H, a straight-chain or branched alkyl group having from 1 to 22 carbon atoms, where one or more, preferably one, —$CH_2$— groups can be replaced by —O—, —CO—O— or —O—CO— and one or more hydrogen atoms in the $C_1$–$C_{22}$ alkyl group can be replaced by F; an aryl or aryloxy group preferably having from 2 to 20 carbon atoms, preferably phenyl or phenyloxy, which can also contain heteroatoms, preferably N, S and/or O, and which can be substituted by one or more radicals $R^6$; or Br, Cl, F, CN, $NO_2$, or $CF_3$, where $R^1$ and $R^2$, $R^7$ and $R^8$, $R^9$ and $R^{10}$ as well as $R^{11}$ and $R^{12}$ can in each case together form a ring system;

$R^3$, $R^{14}$, $R^{15}$ are identical or different, and are H or, preferably, a straight—chain or branched alkyl group having from 1 to 22 carbon atoms, where one or more $CH_2$ groups in the $C_1$–$C_{22}$ alkyl group not directly bonded to N can be replaced by —O—, —CO—O— or —O—CO—; or an aryl group preferably having from 2 to 20 carbon atoms which can also contain heteroatoms, preferably N, S and/or O, and which aryl group can be substituted by one or more, identical or different radicals $R^4$;

$R^4$ are identical or different and are F, Cl, Br, CN, $NO_2$, $CF_3$ or a straight-chain or branched alkyl group having from 1 to 22 carbon atoms, in which one or more $CH_2$ groups in the $C_1$–$C_{22}$ alkyl group not bonded directly to one another can be replaced by —O—, —CO—O— or —O—CO— and one or more H atoms in the $C_1$-$C_{22}$ alkyl group can also be replaced by F;

m is 1, 2, 3 or 4, preferably 1;

n, p are identical or different and are 0, 1, 2, 3 or 4, preferably 0 or 1; with the following polymers being excepted;

a) polymers in which $Ar^1$, Ar2, $Ar^3$ and $Ar^4$ are benzenetriyl, D, E, $F^1$, G, $U^1$ and $V^1$ are single bonds and X and $y^1$ are cyclic or acyclic, conjugated hydrocarbons which can also contain heteroatoms, and can be substituted; and b) poly[2,7—(9,9'-spirobifluorenylene)-4,4'-biphenylene]

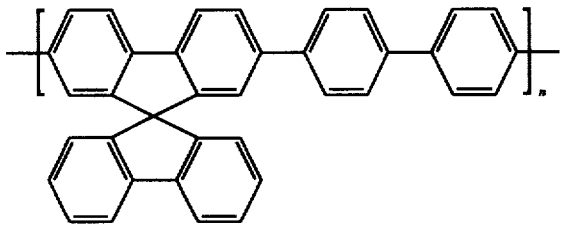

and poly-2,7-(9,9'-spirobifluorene)ylene

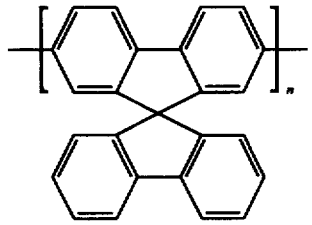

DETAILED DESCRIPTION OF THE INVENTION

The invention relates to polymers containing spiro atoms and methods of using the same as electroluminescence materials.

Compounds in which two polymers are linked via a single spiro center have been proposed as materials for molecular electronics, for example in U.S. Pat. No. 5,026,894 and in J.

M. Tour et al., J. Am. Chem. Soc. 1990, 112, 5662; J. M. Tour et al., J. Am. Chem. Soc. 1991, 113, 7064 and J. M. Tour et al., Polym. Prepr. 1990, 408. A possible suitability of such compounds as electroluminescence materials cannot be deduced therefrom.

EP-A 0 676 461 describes low molecular weight Spiro compounds for use as electroluminescence materials. However, the property profile of these compounds still leaves room for a great deal of improvement.

Preference is given to conjugated polymers, comprising structural elements of the formula (I) in which the symbols and indices have the following meanings:

$Ar^5$, $Ar^6$ are identical or different and are each from 1 to 5 identical or different arylene and/or heteroarylene and/or vinylene groups which may be substituted or unsubstituted;

m is 1 and n, p are identical or different and are 0 or 1, with the abovementioned polymers being excepted.

The polymers of the invention comprising structural units of the formula (I) display, in particular, a high color purity of the emission.

For the purposes of the invention, a polymer is a compound whose electroluminescence spectrum remains essentially the same on addition of further repeating units.

Spiro compounds are compounds in which two ring systems are linked by a single tetravalent atom. This atom is described as a spiro atom as explained in Handbook of Chemistry and Physics 62$^{nd}$ edition (1981-2), CRC Press, pages C-23 to C-25.

The conjugated polymers of the invention comprising structural units of the formula (I) generally have from 2 to 1000, preferably from 4 to 500, more preferably from 10 to 100, structural units of the formula (I).

Furthermore, preference is given to those conjugated polymers comprising structural units of the formula (I) in which the symbols and indices have the following meanings:

$Ar^1$, Ar2, $Ar^3$, $Ar^4$ are identical or different and are benzenetriyl, pyridinetriyl, thiophenetriyl, pyrazinetriyl or pyrimidinetriyl;

$Ar^5$, $Ar^6$ are identical or different, and are

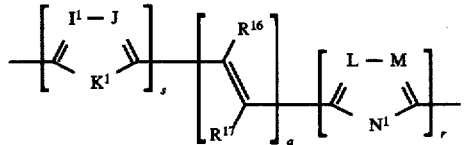

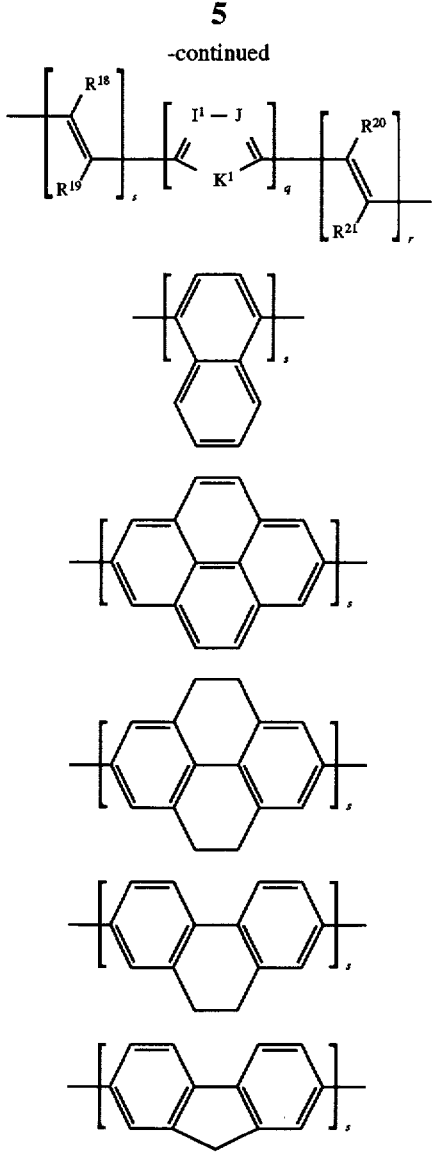

X, Y$^1$ are identical or different and are H, Br, Cl, F, CN, NO$_2$, CF$_3$ or a straight-chain or branched alkyl group having from 1 to 22 carbon atoms, where one or more —CH$_2$— groups in the C$_1$—C$_{22}$— alkyl group can be replaced by —O—, —CO—O— or —O—CO— and one or more hydrogen atoms in the C$_1$—C$_{22}$— alkyl group can be replaced by F; or

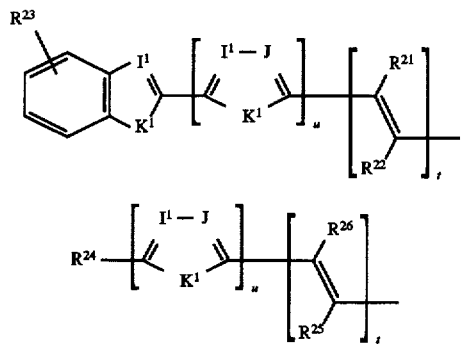

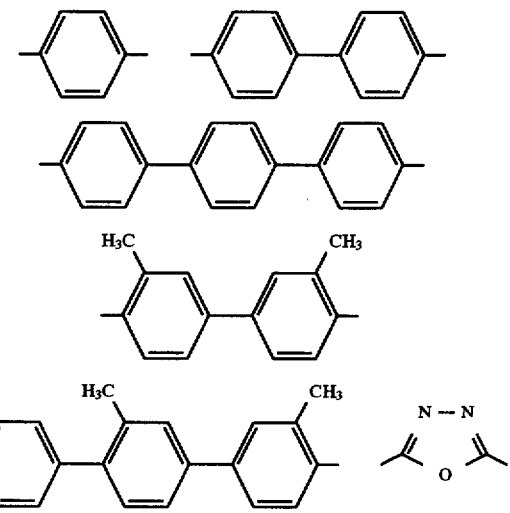

I$^1$, J, L, M are identical or different and are =CR$^{38}$— or =N—;

K$^1$, N$^1$ are identical or different and are —O—, —S—, CR$^{39}$R$^{40}$, —CR$^{41}$=CR$^{42}$—, —NR$^{43}$— or —CR$^{44}$=N—;

R$^{16}$—R$^{42}$ are identical or different and are, identical or different from R$^1$, as defined for R$^1$ in the formula (I);

R$^{43}$, R$^{44}$ are identical or different and are, identical or different from R$^3$, as defined for R$^3$ in the formula (I);

q, r, s, t, u are identical or different and are 0, 1, 2, 3, 4 or 5, with the abovementioned polymers being excepted.

Another preferred embodiment of the invention relates to conjugated polymers comprising structural units of the formula (I) in which:

Ar$^5$, Ar$^6$ are identical or different and are

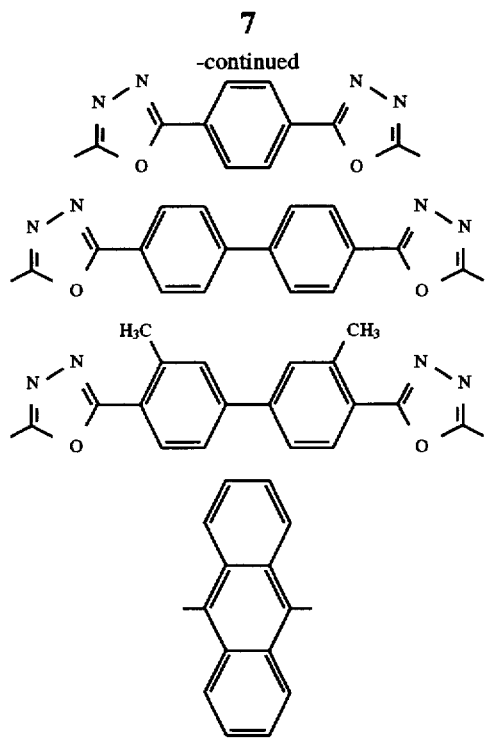
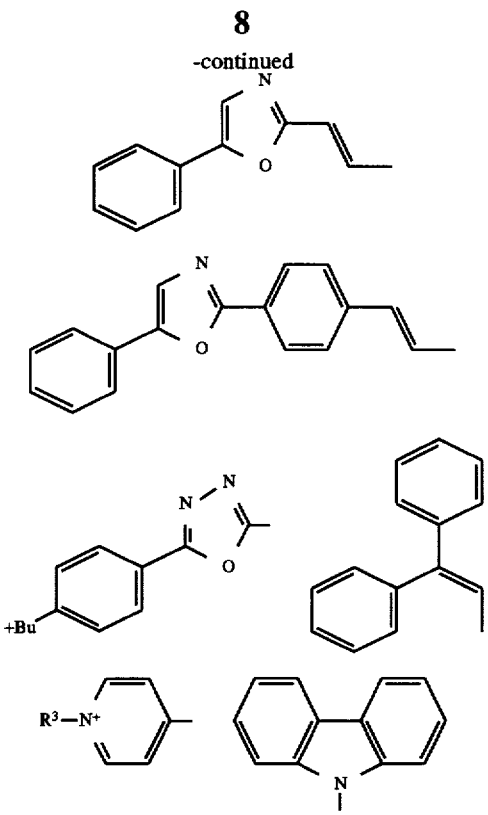

n, p are identical or different and are 0 or 1;

X, Y¹ are identical or different and are H, Br, Cl, F, CN, NO₂, CF₃ or a straight-chain or branched alkyl group having from 1 to 22 carbon atoms, where one or more —CH₂— groups in the Cl—C₂₂ alkyl group can be replaced by —O—, —CO—O— or —O—CO— and one or more hydrogen atoms in the C₁—C₂₂ alkyl group can be replaced by F; or

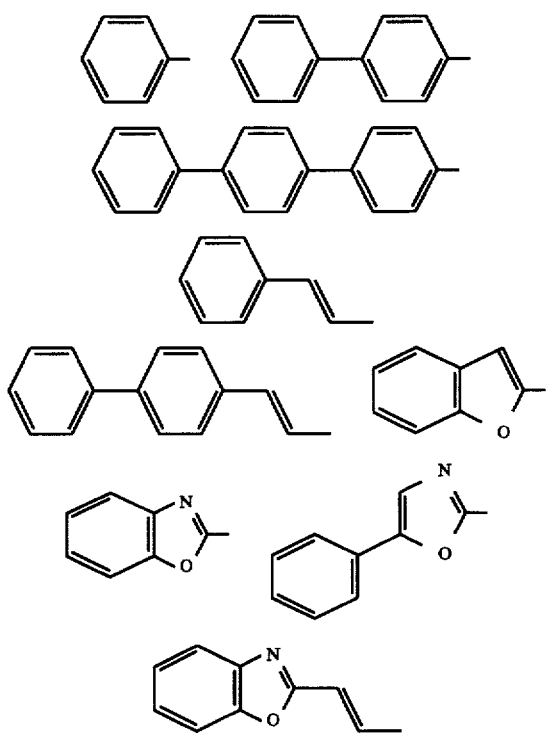
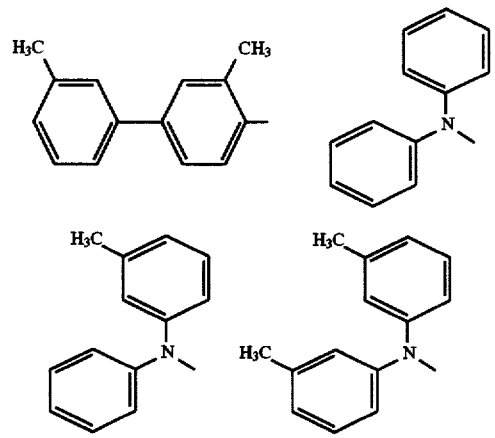

with the abovementioned polymers being excepted.

An even more preferred embodiment relates to conjugated polymers comprising structural units of the formula (I) in which:

Ar⁵, Ar⁶ are identical or different and are

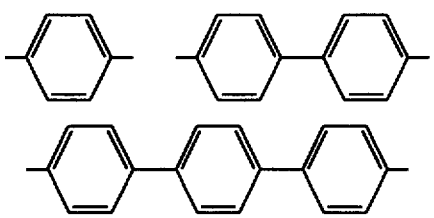

-continued

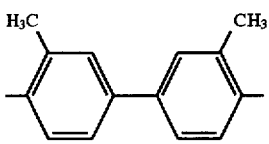

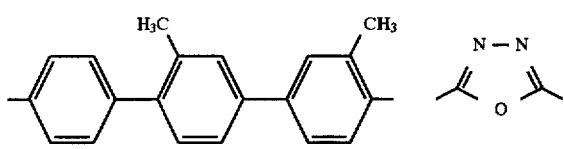

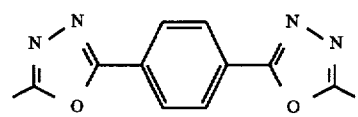

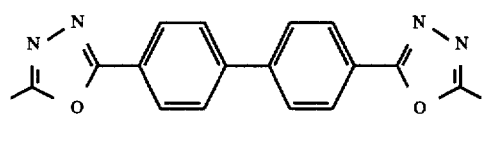

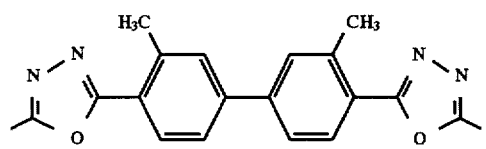

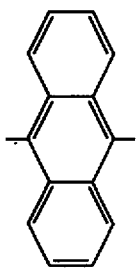

n+p is 0 or 1;

X, Y¹ are identical or different and are H, Br, Cl, F, CN, NO$_2$, CF$_3$ or a straight-chain or branched alkyl group having from 1 to 22 carbon atoms, where one or more —CH$_2$— groups in the C$_1$—C$_{22}$ alkyl group can be replaced by —O—, —CO—O— or —O—CO— and one or more hydrogen atoms in the C$_1$—C$_{22}$ alkyl group can be replaced by F; or

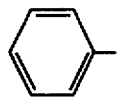 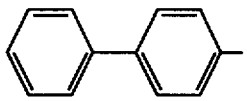

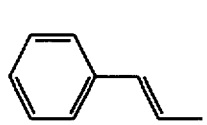 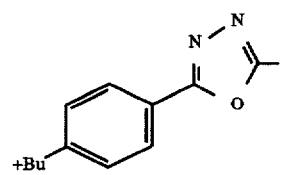

-continued

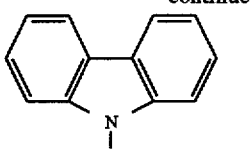 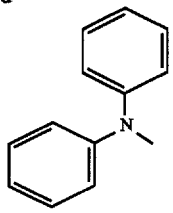

with the abovementioned polymers being excepted.

For some applications it can be advantageous to replace one or more or all hydrogen atoms, preferably those on aromatic rings, by F atoms.

The conjugated polymers of the invention comprising structural units of the formula (I) are homopolymers or copolymers, i.e. they can also have different repeating units of the formula (I).

The conjugated polymers of the invention preferably consist of structural units of the formula (I).

The polymers of the invention are also notable for a considerable increase in the solubility in organic solvents and good film—forming properties. This aids the production of electroluminescence devices and increases their life. Furthermore, the covalently bonded arrangement of the substituents via the spiro atoms, perpendicular to the conjugated main chain, allows the molecule to be built up in such a way that certain properties can be adjusted without disturbing the conjugation in the main chain. Thus, the polymer chain can possess, for example, charge transport or charge injection properties while the substituents possess light-emitting properties. The emission properties of the compounds used according to the invention can be adjusted over the entire range of the visible spectrum by selection of appropriate substituents. The spatial proximity of the two halves fixed by the covalent linkage is here favorable for energy transfer (see, for example B. Liphardt, W. Luttke Liebigs Ann. Chem. 1981, 1118). The polymers of the invention having repeating units for the formula (I) are well suited to achieving blue electroluminescence.

The polymers of the invention can be prepared by literature methods known per se, as are described in standard works on organic synthesis, for example Houben-Weyl, Methoden der Organischen Chemie, Georg-Thieme-Verlag, Stuttgart and in the volumes of the series "The Chemistry of Heterocyclic Compounds, A. Weissberger, E. C. Taylor (eds.), in particular volume 13/5, pp. 30–87.

The preparation is carried out under reaction conditions that are known and suitable for the reactions mentioned. Use can also be made of variants known per se and not mentioned in more detail here.

Starting compounds used for the preparation of the polymers of the invention are, for example, monomers having a 4,5—diaza—9,9'—spirobifluorene (CAS-Reg. No.: 171856-25-0), a spirocyclo(dithiopheno)pentane4,9'-fluorene (CAS—Reg. No.: 28687-00-5), a spiro-9-fluorene-9'-xanthene (CAS-Reg. No.: 15-962-6), a spirodibenzocycloheptaine-5,9'-fluorene (CAS-Reg. No.: 12078849-0) or a 9,9'-spirobixanthene building block (CAS-Reg. No.: 15949-9), which are substituted in the 2,7 or, if desired, 2',7' positions.

One method of synthesizing these monomers is based generally on the Grignard reaction of, for example, 2-bromobiphenyl with an appropriate cyclic ketone as is described, for example, for 4,5-diaza-9,9'-spirobifluorene by P. Piotrowiak et al., Bull. Pol. Acad. Sci., Chem. 1995, 1994, 42, 445. For spiro-9-fluorene-9'-xanthene and 9,9'- spirobixanthene, this is described analogously by R. G. Clarkson and M. Gomberg, J. Am. Chem. Soc. 1930, 52, 2881. For spiro-5-dibenzocycloheptane-9'-fluorene, this is described by D. Hellwinkel et al., Chem. Ber. 1989, 122, 1595. For spiro4-cyclo(dithiopheno)pentane-9'-fluorene, this is described by H. Wynberg et al., Recl. Trav. Chim. Pays-Bas 1970, 89, 545. The basic molecules obtained in this way can be further functionalized.

Possible methods of functionalization are analogous to those for the related compound 9,9'-spirobifluorene; these are described, for example, in J. H. Weisburger, E. K. Weisburger, F. E. Ray, J. Am. Chem. Soc. 1959, 72, 4253; F. K. Sutcliffe, H. M. Shahidi, D. Paterson, J. Soc. Dyers Colour 1978, 94, 306; and G. Haas, V. Prelog, Helv. Chim. Acta 1969, 52,1202.

It can be advantageous to achieve the desired substitution pattern of the desired central basic molecule by spiro linkage of starting materials that are substituted appropriately already, e.g. using 2,7-difunctionalized xanthenone, and then, if desired, further functionalizing the still free 2',7' positions after construction of the spiro center (e.g. by halogenation or acylation, with subsequent C-C linkage after conversion of the acetyl groups into aldehyde groups, or by heterocycle formation after conversion of the acetyl groups into carboxyl groups).

The further functionalization can be carried out by literature methods known per se, as are described in standard works on organic synthesis, e.g. Houben-Weyl, Methoden der Organischen Chemie, Georg-Thieme Verlag, Stuttgart and in the appropriate volumes of the series "The Chemistry of Heterocyclic Compounds" by A. Weissberger and E. C. Taylor (Editors).

For the synthesis of the groups $Ar^5$, $Ar^6$, X, $Y^1$, reference may be made, for example to DE-A 23 44 732, 24 50 088, 24 29 093, 25 02 904, 26 36 684, 27 01 591 and 27 52 975 for compounds containing 1,4-phenylene groups; DE-A 26 41 724 for compounds containing pyrimidine-2,5-diyl groups; DE-A 40 26 223 and EP-A 03 91 203 for compounds containing pyridine-2,5-diyl groups; DE-A 32 31 462 for compounds containing pyridazine-3,6-diyl groups; N. Miyaura, T. Yanagi and A. Suzuki in Synthetic Communications 1981, 11, 513 to 519; DE-C 39 30 663; M. J. Sharp, W. Cheng, V. Snieckus in Tetrahedron Letters 1987, 28, 5093; G. W. Gray in J. Chem. Soc. Perkin Trans II 1989, 2041 and Mol. Cryst. Liq. Cryst. 1989, 172, 165, Mol. Cryst. Liq. Cryst. 1991, 204, 43 and 91; EP-A 0 449 015; WO 89/12039; WO 89/03821; EP-A 0 354 434 for the direct linking of aromatics and heteroaromatics.

The preparation of disubstituted pyridines, disubstituted pyrazines, disubstituted pyrimidines and disubstituted pyridazines may be found, for example, in the appropriate volumes of the series "The Chemistry of Heterocyclic Compounds" by A. Weissberger and E. C. Taylor (Editors).

The abovementioned monomers can be polymerized to give the polymers of the invention, having repeating units of the formula (I), by a number of methods.

For example, derivatives of the abovementioned basic molecules can be polymerized oxidatively (e.g. using $FeCl_3$, see, for example, P. Kovacic, N. B. Jones, Chem. Ber. 1987, 87, 357 to 379; M. Weda, T. Abe, H. Awano, Macromolecules 1992, 25, 5125) or electrochemically (see, for example, N. Saito, T. Kanbara, T. Sato, T. Yamamoto, Polym. Bull. 1993, 30, 285).

Likewise, the polymers of the invention can be prepared from 2,7-difunctionalized derivatives.

Dihaloaromatics can be polymerized in the presence of copper/triphenylphosphine catalysts (see, for example, G.

W. Ebert, R. D. Rieke, J. Org. Chem. 1988, 53, 44829) or nickel/triphenylphosphine catalysts (see, for example, H. Matsumoto, S. Inaba, R. D. Rieke, J. Org. Chem. 1983, 48, 840).

Aromatic diboronic acids and aromatic dihalides or mixed aromatic halide-boronic acids can be polymerized by coupling reactions in the presence of palladium catalysts (see, for example, M. Miyaura, T. Yanagi, A. Suzuki, Synth. Commun. 1981, 11, 513; R. B. Miller, S. Dugar, Organometallics 1984, 3,1261).

Aromatic distannanes can be polymerized, for example, in the presence of palladium catalysts, as described in J. K. Stille, Angew. Chem. Int. Ed. Engl. 1986, 25, 508.

Furthermore, the abovementioned dibromo compounds can be converted into the dilithio or digrignard compounds, which are then polymerized with further dibromo compound, by means of $CuCl_2$ (see, for example, G. Wittig, G. Klar, Liebigs Ann. Chem. 1967, 704, 91; H. A. Staab, F. Bunny, Chem. Ber. 1967, 100, 293; T. Kaufmann, Angew. Chem. 1974, 86, 321 to 354) or by electron transfer of unsaturated 1,4-dihalo compounds (see, for example, S. K. Taylor, S. G. Bennett, K. J. Harz, L. K. Lashley, J. Org. Chem. 1981, 46, 2190).

The synthesis of the polymers of the invention comprising repeating units of the formula (I) however, also can be carried out by polymerization of a 2,7-difunctionalized derivative with a further suitable difunctionalized compound.

Thus, for example, 2',7'-dibromo-4,5-diaza-9,9'-spirobifluorene can be polymerized with biphenyl4,4'-bisboronic acid. In this way it is possible to build up various heterocyclic units simultaneously with the polymerization step, e.g. the formation of oxadiazole units from difunctional carboxylic acid halides and difunctional carboxylic acid hydrazides or from the corresponding dicarboxylic acid and hydrazine sulfate (B. Schulz, E. Leibnitz, Acta Polymer. 1992, 43, page 343; JP- A 05/178, 990) or alternatively from dicarboxylic acid halides and bistetrazoles (C. A. Abshire, C. S. Marvel, Makromol. Chem. 1961, 44 to 46, page 388).

To prepare copolymers, it is possible, for example, to copolymerize different monomers containing structural elements of the formula (I).

The work-up is carried out by known methods, with which those skilled in the art are familiar, as are described, for example, in R. J. Young, P. A. Lovell, Introduction to Polymers, Chapman & Hall, London, 1991. For example, the reaction mixture can be filtered, diluted with aqueous acid, extracted and the crude product obtained after drying and taking off the solvent; it can be further purified by reprecipitation.

Terminal bromine atoms can be removed reductively, for example, using $LiAlH_4$ (see, for example, J. March, Advanced Organic Chemistry, 3rd edition, McGraw-Hill, p. 510).

The polymers of the invention can be used as electroluminescence materials.

The invention therefore also provides for the use of polymers comprising structural units of the formula (I) as electroluminescence materials.

For the purposes of the invention, electroluminescence materials are materials that can be used as the active layer in an electroluminescence device. Active layer means that the layer is capable of emitting light on application of an electric field (light-emitting layer) and/or that it improves the injection and/or the transport of the positive and/or negative charges (charge injection or charge transport layer). Particular mention should be made of the excellent hole- conducting properties of the materials of the invention, which can be employed, for example, as the hole transport layer in photocopiers and laser printers.

The invention therefore also provides an electroluminescence material, comprising one or more polymers, comprising structural units of the formula (I).

The electroluminescence material of the invention usually comprises one or more polymers of the invention as main component, i.e. in an amount of greater than 50% by weight, or as additive.

For use as electroluminescence materials, solutions of polymers, comprising structural units of the formula (I), are applied in the form of a film to a substrate, generally by known methods, with which those skilled in the art are familiar, for example, casting, dipping, spincoating or curtain coating.

The invention therefore also provides a process for producing an electroluminescence material which comprises applying one or more polymers comprising structural units of the formula (I) in the form of a film to a substrate.

The invention additionally provides an electroluminescence device comprising one or more active layers, where at least one of these active layers comprises one or more polymers of the invention, comprising structural elements of the formula (I). The active layer can be, for example, a light-emitting layer and/or a transport layer and/or a charge injection layer.

The general structure of such electroluminescence devices is described, for example, in U.S. Pat. Nos. 4,539,507 and 5,151,629. Polymer-containing electroluminescence devices are described, for example, in WO 90/13148 or EP-A 0 443861.

The devices usually comprise an electroluminescent layer between a cathode and an anode, where at least one of the electrodes is transparent. In addition, an electron injection and/or electron transport layer can be introduced between the electroluminescent layer and the cathode and/or a hole injection and/or hole transport layer can be introduced between the electroluminescent layer and the anode. Suitable cathode materials are metals and/or metal alloys, preferably having a low work function, e.g. Ca, Mg, Al, In, Mg/Ag. Suitable anode materials include not only metals such as Au but also conductive metal oxides such as ItO (Indium oxide/tin oxide) on a transparent substrate, e.g. of glass or a transparent polymer.

In operation, the cathode is placed at a negative potential relative to the anode. This results in injection of electrons from the cathode into the electron injection/electron transport layer or directly into the light-emitting layer. At the same time, holes from the anode are injected into the hole injection layer/hole transport layer or directly into the light-emitting layer.

The injected charge carriers move toward one another through the active layers under the influence of the applied potential. This leads, at the interface between charge transport layer and light-emitting layer or within the light-emitting layer, to electron/hole pairs that recombine with emission of light.

The color of the emitted light can be varied, by means of the compound used as the light-emitting layer, with not only copolymers but also mixtures of the polymers of the invention, with other electrooptically active or passive materials being expressly included.

Electroluminescence devices are employed, for example, as self-illuminating display elements such as control lamps, alphanumeric displays, signs and in optoelectronic couplers. Owing to their good hole transport properties, the materials of the invention are also suitable as photoconductor elements, e.g. in photocopiers and laser printers.

EXAMPLES

The following examples are illustrative of some of the products and method of making the same falling within the scope of the present invention. They are, of course, not to be considered in any way limitative of the invention. Numerous changes and modifications can be made with respect to the invention.

Example 1: 4,5-Diaza-9,9'-spirobifluorene 0.1 mol of 4,5-diazafluorenone (commercially available from Maybridge Chemical Co. Ltd.) dissolved in 300 ml of dry diethyl ether was added dropwise over a period of 10 minutes to a boiling solution of 0.1 mol of Grignard reagent prepared from 2-bromobiphenyl and magnesium in likewise dry diethyl ether (100 ml). The mixture was refluxed for a further 3 hours. After cooling, the precipitated, yellow Mg complex was filtered off with suction, washed with a little diethyl ether and finally hydrolyzed with neutral, buffered ice water. After stirring for some time the 9-(2-biphenyl)4,5-diazafluoren-9-ole thus formed was filtered off with suction and dried. The desired spiro compound was obtained therefrom by refluxing for about 3 hours in 100 ml of glacial acetic acid/5 ml of HCl (37%). The product crystallizes from the reaction solution in the form of the dihydrochloride. The neutral form is obtained by stirring this salt with $NaHCO_3$ solution. Recrystallization from ethanol gives about 55-70% of colorless product, based on 4,5-diazafluorenone. $^1H$ NMR ($CDCl_3$) [δ, multiplicity, integral, assignment] 6.73 (dd, 2 H, H-1'/8'), 7.10 (dt, 2 H, H-2'/7'), 7.25 (m, 4 H, H-3'/6', H-217), 7.37 (dd, 2 H, H-4'/5'), 8.63 (dd, 2 H, H-3/6).

Example 2: Spiro-9-fluorene-9'-xanthene 4.5 g of fluorenone dissolved in 100 ml of dry diethyl ether was added dropwise over a period of 10 minutes to a boiling solution of the Grignard reagent prepared from 8.9 g of 2-iodo(diphenyl ether) and 0.73 g of magnesium in likewise dry diethyl ether (250 ml). The mixture was refluxed for a further 10 hours. After cooling, the precipitated, yellow Mg complex was filtered off with suction, washed with a little diethyl ether and finally hydrolyzed with ice water/$NH_4Cl$. After stirring for some time, the fluorenol derivative thus formed was filtered off with suction and dried. The desired spiro compound was obtained therefrom by refluxing for about 3 hours in 100 ml of glacial acetic acid/5 ml of HCl (37%). The product crystallizes from the reaction solution in the form of colorless needles. Recrystallization from ethanol gives about 5060% of colorless product, based on fluorenone. $^1H$ NMR ($CDCl_3$) [σ, multiplicity, integral, assignment] 6.55 (dd, 2 H, H-1'/8'), 6.68 (dd, 2 H, H-1/8), 7.12 (m, 4 H, H-2/7, H-2'/7'), 7.25 (m, 4 H, H-3/6, H-3'/6'), 7.45 (dd, 2 H, H-4'/5'), 7.77 (dd, 2 H, H-4/5).

Example 3: Spiro-5-dibenzocycloheptane-9'-fluorene 55 mmol of dibenzosuberone dissolved in 100 ml of dry diethyl ether was added dropwise over a period of 10 minutes to a boiling solution of 75 mmol of Grignard reagent prepared from 2-bromobiphenyl and magnesium in likewise dry diethyl ether (100 ml). The mixture was refluxed for a further 24 hours. After cooling, the yellow suspension was hydrolyzed with $NH_4Cl$/ice water. The phases were separated; the aqueous phase was shaken repeatedly with diethyl ether. The combined organic phases were evaporated and the solid formed can be used directly for the further reaction. The desired spiro compound was obtained therefrom by refluxing for about 3 hours in 100 ml of trifluoroacetic acid. The product crystallizes from the reaction solution in the form of colorless needles. Recrystallization from petroleum ether (80/110) gives about 50-70% of colorless product, based on dibenzosuberone. $^1$H NMR (CDCl$_3$) [σ, multiplicity, integral, assignment] 3.35 (s, 4H, —CH$_2$—CH$_2$—), 6.38 (dd, 2 H, H4/6), 6.68 (dd, 2 H, H-1'/8'), 6.74 (dt, 2 H, H-317), 6.97 (dt, 7.15 (m, 4 H, H-2/8, H-3'/6'), 7.31 (dd, 2 H, H-1/9), 7.79 (dd, 2 H, H4'/5').

Example 4: 2',7'-Dibromo-4,5-diaza-9,9'-spirirobifluorene 10 ml of bromine diluted with 10 ml of chloroform was added over a period of 5 minutes to a refluxing solution of 10 g of 4,5-diaza-9,9'-spirobifluorene (as prepared in Example 1) in 50 ml of chloroform that has been admixed with 100 mg of FeCl$_3$. The resulting reaction mixture was refluxed for a further 2 hours. The excess bromine was then quickly destroyed by stirring in about 100 ml of Na$_2$SO$_3$. The phases thus formed were separated; the organic phase was shaken with NaHCO$_3$ solution and water, and subsequently evaporated to a total volume of about 30 ml. After allowing to stand overnight at -18° C., the desired product can be filtered off with suction as a colorless powder. Further purification is generally not necessary: about 75% yield based on 4,5-diaza-9,9'-spirabifluorene. $^1$H NMR (CDCl$_3$) [σ, multiplicity, integral, assignment] 6.85 (d, 2 H, H-1'/8'), 7.28 (t 2 H, H-2/7), 7.34 (dd, 2 H, H-1/8), 7.67 (dd, 2 H, H-3'/6'), 7.85 (d, 2 H, H-4'/5'), 8.60 (dd, 2 H, H-3/6).

Example 5: Spiro-2,7-dibromo-9-fluorene-9'-xanthene 9.6 g of bromine diluted with 10 ml of chloroform was added over a period of 15 minutes to a solution of 10 g of spiro-9-fluorene-9'-xanthene (prepared as in Example 2) in 50 ml of chloroform that has been admixed with 100 mg of FeCl$_3$. The resulting reaction mixture was stirred for a further 2 hours at room temperature. The organic phase was then shaken first with NaSO$_3$ solution, subsequently with NaHCO$_3$ solution and water. The organic phase was finally evaporated to a total volume of 40 ml. After allowing to stand overnight at -1 8° C, the desired product can be filtered off with suction as a colorless powder. Further purification is generally not necessary: about 45% yield. $^1$H NMR (CDCl$_3$) [σ, multiplicity, integral, assignment] 6.58 (dd, 2 H, H-1'/8'), 6.85 (d, 2 H, H-1/8), 7.08 (dt, 2 H, H-2'/7'), 7.20 (dt, 2 H, H-3'6'), 7.43 (dd, 2 H, H4'/5'), 7.55 (dd, 2 H, H-3/6), 7.67 (d, 2 H, H4/5).

Example 6: Spiro-2',7'-dibromo-5-dibenzocvcloheDtane-9'-fluorene 9.6 g of bromine diluted with 10 ml of chloroform was added over a period of 15 minutes to a solution of 10.3 g of spiro-5-dibenzocycloheptane- 9'-fluorene (prepared as in Example 3) in 50 ml of chloroform that has been admixed with 100 mg of FeCl$_3$ and was protected from light. The reaction mixture formed was stirred for a further 4 hours at room temperature. The organic phase was then shaken first with NaSO$_3$ solution, subsequently with NaHCO$_3$ solution and water. The organic phase was evaporated to dryness on a rotary evaporator. The yellowish crude product obtained was prepurified by column chromatography (SiO$_2$, dichloromethane) and finally recrystallized from chloroform/hexane: about 50% yield. $^1$H NMR (CDCl$_3$) [σ, multiplicity, integral, assignment] 3.32 (s, 4H, —CH$_2$—CH$_2$—), 6.38 (dd, 2 H, H-4/6), 6.74 (dt, 2 H, H-3/7), 6.82 (d, 2 H, H-1'/8'), 7.18 (dt, 2 H, H-2/8), 7.33 (dd, 2 H, H-1/9), 7.58 (dd, 2 H, H-3',6'), 7.69 (d, 2 H, H-4'/5').

Example 7: Polymerization of 2',7'-dibromo4,5-diaza-9,9'-spirobifluorene (Polymer 1 )

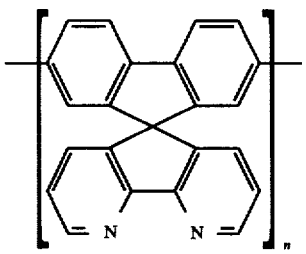

1 mmol of NiCl$_2$(PPh$_3$)$_2$, 20 mmol of PPh$_3$, 2 mmol of 2,2'-bipyridyl and 40 mmol of Zn dust were dried under argon. To this solids mixture was added 5 g of 2',7'-dibromo4,5-diaza-9,9'-spirobifluorene dissolved in 40 ml of tetrahydrofuran dried over Nalbenzophenone. The reaction mixture was refluxed for about 3 days with vigorous stirring. The cooled reaction mixture was filtered and subsequently evaporated to dryness. The reaction mixture was redissolved in chloroform and shaken a number of times in 2 N HCl in order to remove residual Zn. The organic phase was subsequently washed until neutral with NaHCO$_3$ solution and H$_2$O. The combined HCl washings were carefully neutralized with NaHCO$_3$ solution and again shaken with chloroform. The combined chloroform solutions were evaporated to about 30 ml and the polymer was precipitated by pouring into 10 times the volume of methanol. To further purify it and to remove low molecular weight constituents, it was taken up in chloroform and precipitated in methanol a total of three more times. This finally gives about 2.5 g of a pale yellow polymer (about 75%). M$_w$ (GPC, PS-standard, THF): 15000 (P$_D$=2.3).

Example 8: Polymerization of spiro-2,7-dibromo-9-fluorene-9'-xanthene (Polymer 2)

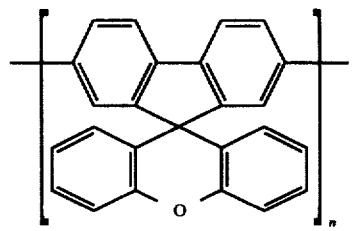

The polymerization of spiro-2,7-dibromo-9-fluorene-9'-xanthene was carried out using a method similar to that described in Example 7. The work-up was likewise carried out in a similar way, but neutralization of the HCl phase and shaking again with chloroform is not necessary here. This finally gives a pale yellow polymer (about 55%). M$_w$ (GPC, PS-standard, THF containing 1% of formic acid): 22000 (P$_D$=2.9).

Example 9: Polymerization of spiro-2',7'-dibromo-5-dibenzocycloheptane-9'-fluorene (Polymer 3)

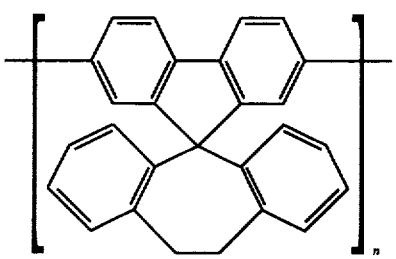

The polymerization of spiro-2',7'-dibromo-5-dibenzocycloheptane-9'-fluorene was carried out using a method similar to that described in Example 7. The work-up was likewise carried out in a similar way, but neutralization of the HCl phase and shaking again with chloroform is likewise not necessary here. This finally gives a pale yellow polymer (about 60%). $M_w$ (GPC, PS-standard, THF containing 1 % of formic acid): 10000 ($P_D$=2.1).

Example 10: Polymerization of spiro-2',7'-dibromo-5-dibenzocvcloheptane-9'- fluorene with biphenyl4.4'-diboronic acid (Polymer 4)

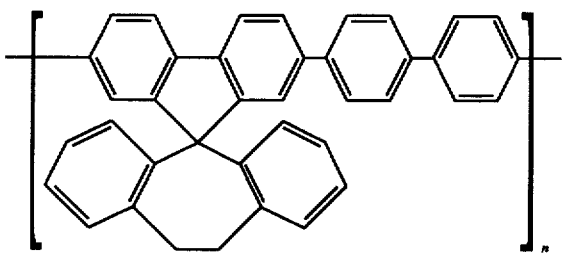

2 mmol of spiro-2',7'-dibromo-5-dibenzocycloheptane-9'-fluorene and 2.2 mmol of biphenyl-4,4'-ylenediboronic acid were added to a mixture of 25 ml of THF and 10 ml of ethanol. 20 ml of I molar aqueous potassium carbonate solution were added thereto. The mixture was refluxed under nitrogen and 50 mg of tetrakis(triphenylphosphine) palladium dissolved in 5 ml of THF were added. After refluxing for 48 hours, the mixture was cooled to room temperature. The yellow polymer formed was filtered off with suction, boiled for 2 hours with dilute hydrochloric acid and, after being again filtered off with suction, washed free of acid with water. The polymer was (as described in Example 7) dissolved in chloroform and precipitated in methanol a number of times. This finally gives a yellow polymer (about 40%). $M_w$ (GPC, PS-standard, THF containing 1 % of formic acid): 7000 ($P_D$=2.7).

Example 11: Photoluminescence measurement on the polymers 1 to 4

The photoluminescence spectra of these polymers were recorded both in dilute solution (<1 mg/100 ml of $CHCl_3$) and as films (thickness in each case from about 80 to 100 nm). Without exception, the polymers display a blue emission. The emission maxima are summarized in the table below.

|  | $\lambda_{max}$ [nm] in solution; Excitation: 343 nm | $\lambda_{max}$ [nm] in a film; Excitation: 366 nm |
|---|---|---|
| Polymer 1 | 415, 440 | 425, 449 |
| Polymer 2 | 390, 414 | 405, 430 |
| Polymer 3 | 392, 418 | 400, 430 |
| Polymer 4 | 394, 419 444 | 404, 429, 505 |

Example 12: Electroluminescence device

A chloroform solution of the polymer to be measured (concentration: 15 mg/ml) was applied under nitrogen to a glass support coated with ITO (indium tin oxide) (structured, strips 2 mm wide) by spincoating at 1000 rpm. The glass support was transferred via a lock into a high vacuum vapor deposition unit with maintenance of the protective gas atmosphere. At $2 \times 10^{-5}$ mbar, Ca strips (2 mm wide, 230 nm thick) were vapor-deposited onto the polymer layer at right angles to the ITO strips using a mask. The device thus obtained, ITO/Polymer/Ca, was placed in a specimen holder and the electrodes were connected via spring finger connectors to a current source, with an ITO strip being made positive and a Ca strip being made negative. On application of a potential of more than 7 V, the corresponding matrix element displayed a blue electroluminescence whose spectral form is virtually identical to the film photoluminescences indicated above. For the polymers 1 to 4, a radiant intensity of more than 500 $Cd/m^2$ was obtained in each case at a sufficiently high potential.

We claim:

1. A conjugated polymer comprising structural units of the formula (I),

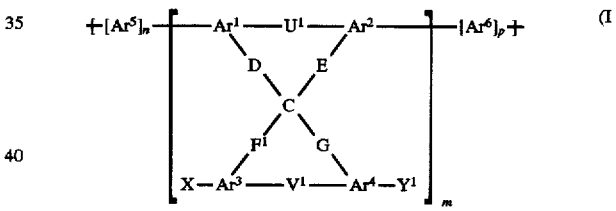

where the symbols and indices have the following meanings:

D, E, $F^1$, G are identical or different and are —$CR^1R^1$—, —O—, —S—, —$NR^3$— or a chemical bond;

$Ar^1$, Ar2 are identical or different, and are benzenetriyl, thiophenetriyl, furantriyl, pyrroletriyl, pyridinetriyl, pyrimidinetriyl, pyrazinetriyl or pyridazinetriyl, where each of these groups can, independently of one another, be substituted by from 1 to 3 identical or different radicals $R^4$;

Ar3, Ar4 are identical or different, and are as defined for $Ar^1$, Ar2; or are cyclohexanetriyl, cyclopentanetriyl, cyclohexenetriyl or cyclopentenetriyl, where each of these groups can, independently of one another, be substituted by from 1 to 3 identical or different radicals $R^4$;

$U^1$, $V^1$ are identical or different, and are —$CR^5$=$CR^6$—, —$CR^7R^8$—, —$CR^9R^{10}$—$CR^{11}R^{12}$—$NR^{13}$—$SiR^{14}R^{15}$— O—, —S—, —SO—, —$SO_2$—, —CO— or a chemical bond;

$Ar^5$, Ar6, X, $y^1$ are identical or different, cyclic or acyclic, conjugated hydrocarbons having from 2 to 100 carbon atoms, which can also contain heteroatoms and which can be substituted by one or more radicals $R^4$; X and/or $Y^1$ can also be, identical or different, H or $R^1$;

$R^1$, $R^2$, $R^5$, $R^6$, $R^7$, $R^8$, $R^9$, $R^{10}$, $R^{11}$, $R^{12}$ are identical or different and are H, Br, Cl, F, CN, $NO_2$, or $CF_3$ or a straight-chain or branched alkyl group having from 1 to 22 carbon atoms, where one or more —$CH_2$— groups can be replaced by —O—, —CO—O— or —O—CO— and one or more hydrogen atoms in the $C_1$-$C_{22}$ alkyl group can be replaced by $F^1$; an aryl or aryloxy group which can also contain heteroatoms and be substituted by one or more radicals $R^6$; where $R^1$ and $R^2$, $R^7$ and $R^8$, $R^9$ and $R^{10}$ as well as $R^{11}$ and $R^{12}$ can in each case together form a ring system;

$R^3$, $R^{14}$, $R^{15}$ are identical or different, and are H or, a straight-chain or branched alkyl group having from 1 to 22 carbon atoms, where one or more $CH_2$ groups in the $C_1$-$C_{22}$ alkyl group not directly bonded to N, can be replaced by —O—, —CO—O— or —O—CO—; or an aryl group having from 2 to 20 carbon atoms that can contain heteroatoms and, which aryl group can be substituted by one or more, identical or different radicals $R^4$;

$R^4$ are identical or different and are F, Cl, Br, CN, $NO_2$, $CF_3$ or a straight-chain or branched alkyl group having from 1 to 22 carbon atoms, in which one or more $CH_2$ groups in the $C_1$-$C_{22}$ alkyl group not bonded directly to one another can be replaced by —O—, —CO—O— or —O—CO— and one or more H atoms in the $C_1$-$C_{22}$ alkyl group can also be replaced by F;

m is 1, 2, 3 or 4;

n, p are identical or different and are 0, 1, 2, 3 or 4; with the following polymers being excepted:

a) polymers in which $Ar^1$, $Ar^2$, $Ar^3$ and $Ar^4$ are benzenetriyl; D, E, $F^1$, G, $U^1$ and $V^1$ are single bonds and X and $y^1$ are cyclic or acyclic, conjugated hydrocarbons, which contain heteroatoms and also substituted, and b) poly[2,7-(9,9'-spirobifluorenylene)-4,4'-biphenylene]

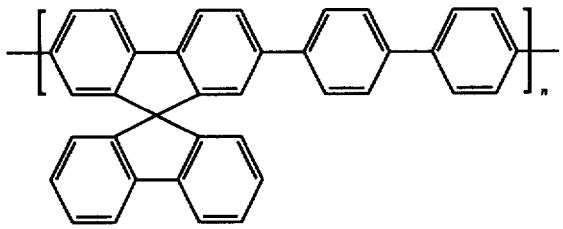

and poly-2,7-(9,9'-spirobifluorene)ylene

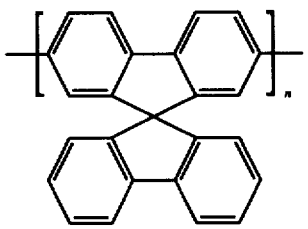

2. A conjugated polymer as claimed in claim 1, comprising from 2 to 1000 structural units of the formula (I).

3. A conjugated polymer as claimed in claim 1, comprising various structural units of the formula (I).

4. A conjungated polymer as claimed in claim 2, comprising various structural units of the formula (I).

5. A conjugated polymer as claimed in claim 1, wherein the symbols and indices in the formula (I) have the following meanings:

$Ar^5$, $Ar^6$ are identical or different, and are each from 1 to 5 identical or different arylene and/or heteroarylene and/or vinylene groups, which are substituted or unsubstituted;

m is 1 and n, p are identical or different, and are 0 or 1.

6. A conjugated polymer as claimed in claim 2, wherein the symbols and indices in the formula (I) have the following meanings:

$Ar^5$, $Ar^6$ are identical or different, and are each from 1 to 5 identical or different arylene and/or heteroarylene and/or vinylene groups, which are substituted or unsubstituted;

m is 1 and n, p are identical or different, and are 0 or 1.

7. A conjugated polymer as claimed in claim 3, wherein the symbols and indices in the formula (I) have the following meanings:

$Ar^5$, $Ar^6$ are identical or different, and are each from 1 to 5 identical or different arylene and/or heteroarylene and/or vinylene groups, which are substituted or unsubstituted;

m is 1 and n, p are identical or different, and are 0 or 1.

8. A conjugated polymer as claimed in claim 4, wherein the symbols and indices in the formula (I) have the following meanings:

$Ar^5$, $Ar^6$ are identical or different, and are each from 1 to 5 identical or different arylene and/or heteroarylene and/or vinylene groups, which are substituted or unsubstituted;

m is 1 and n, p are identical or different, and are 0 or 1.

9. A conjugated polymer as claimed in claim 1, wherein the symbols and indices in the formula (I) have the following meanings:

$Ar^1$, $Ar^2$, $Ar^3$, $Ar^4$ are identical or different, and are benzenetriyl, pyridinetriyl, thiophenetriyl, pyrazinetriyl or pyrimidinetriyl;

$Ar^5$, $Ar^6$ are identical or different, and are

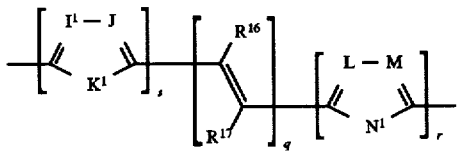

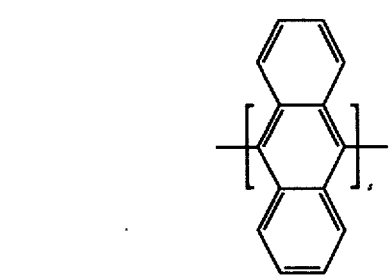

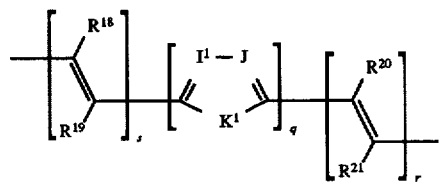

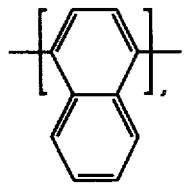

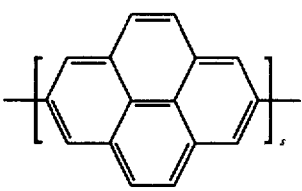
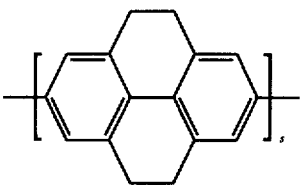
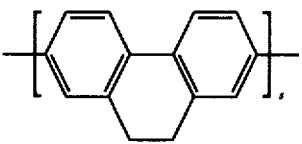
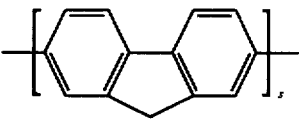

X, Y¹ are identical or different, and are H, Br, Cl, F, CN, NO₂, CF₃ or a straight-chain or branched alkyl group having from 1 to 22 carbon atoms, where one or more —CH₂— groups in the $C_1$-$C_{22}$ alkyl group can be replaced by —O—, —CO—O—, —O—CO— and one or more hydrogen atoms in the $C_1$-$C_{22}$ alkyl group can be replaced by F; or

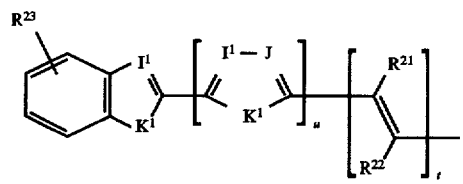
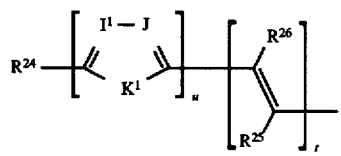
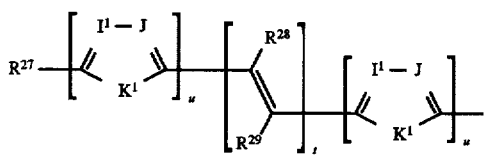
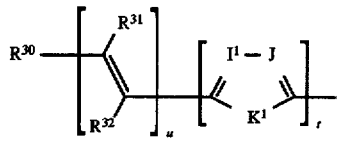

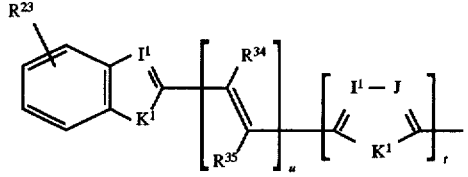
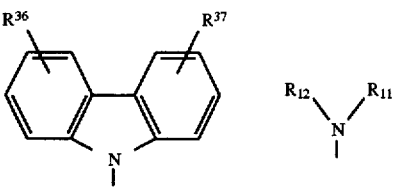

I¹, J, L, M are identical or different, and are —O—, —IS—, $CR^{39}R^{40}$, —$CR^{41}$=$CR^{42}$—, $R^{16}$–$R^{42}$ are identical or different, and are, identical or different from $R^1$, as defined for $R^1$ in the formula (I);

$R^{43}$, $R^{44}$ are identical or different, and are, identical or different to $R^3$, as defined for $R^3$ in the formula (I);

q, r, s, t, U are identical or different, and are 0, 1, 2, 3, 4 or 5, with the abovementioned polymers being excepted.

10. A conjugated polymer as claimed in claim 2, wherein the symbols and indices in the formula (I) have the following meanings:

Ar¹, Ar², Ar³, Ar4 are identical or different, and are benzenetriyl, pyridinetriyl, thiophenetriyl, pyrazinetriyl or pyrimidinetriyl;

Ar⁵, Ar⁶ are identical or different, and are

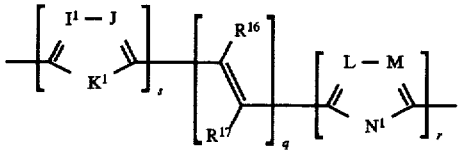
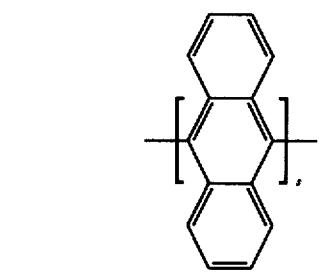
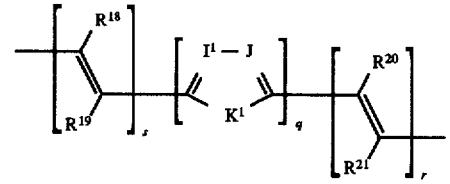
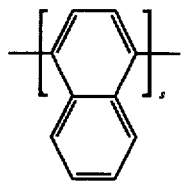

-continued

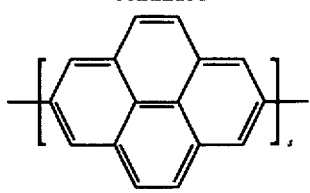

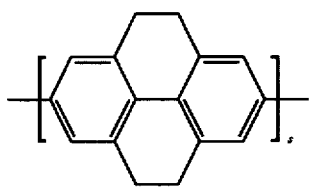

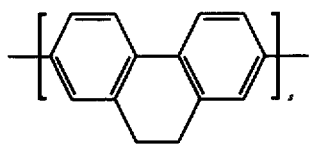

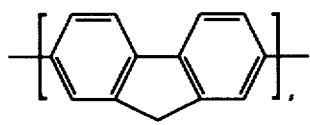

X, $Y^1$ are identical or different, and are H, Br, Cl, F, CN, $NO_2$, $CF_3$ or a straight-chain or branched alkyl group having from 1 to 22 carbon atoms, where one or more —$CH_2$— groups in the $C_1$-$C_{22}$ alkyl group can be replaced by —O—, —CO— —O—, —O —CO— and one or more hydrogen atoms in the $C_1$-$C_{22}$ alkyl group can be replaced by F; or

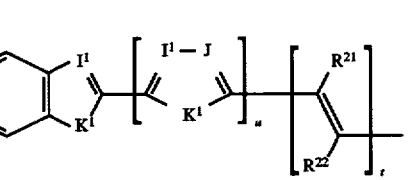

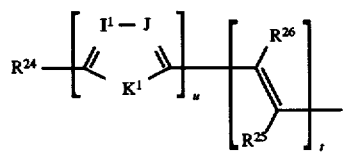

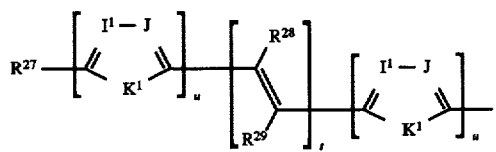

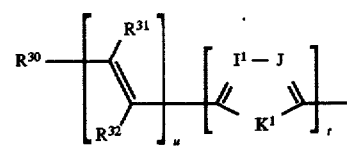

-continued

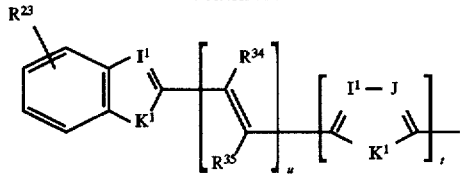

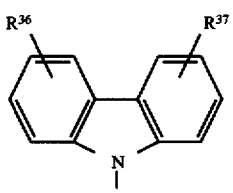 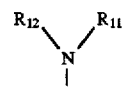

$I^1$, J, L, M are identical or different, and are =$CR^{38}$— or =N—;

$K^1$, $N^1$ are identical or different, and are —O—, —S—, $CR^{39}R^{40}$, —$CR^{41}$—$CR^{42}$—, —$NR^{43}$—, or —$CR^{44}$=N;

$R^{16}$-$R^{42}$ are identical or different, and are, identical or different from $R^1$, as defined for $R^1$ in the formula (I);

$R^{43}$, $R^{44}$ are identical or different, and are, identical or different to $R^3$, as defined for $R^3$ in the formula (I);

q, r, s, t, u are identical or different, and are 0, 1, 2, 3, 4 or 5, with the abovementioned polymers being excepted.

11. A conjugated polymer as claimed in claim 5, wherein the symbols and indices in the formula (I) have the following meanings:

$Ar^1$, $Ar^2$, $Ar^3$, $Ar^4$ are identical or different, and are benzenetriyl, pyridinetriyl, thiophenetriyl, pyrazinetriyl or pyrimidinetriyl;

$Ar^5$, $Ar^6$ are identical or different, and are

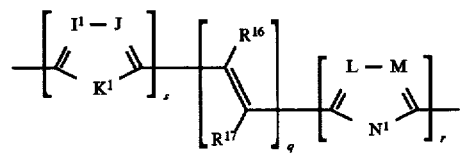

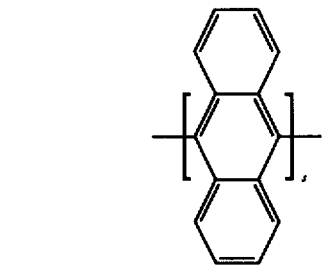

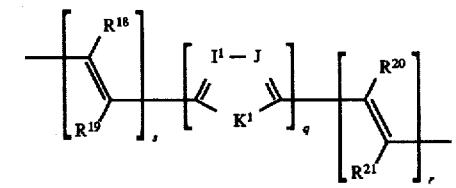

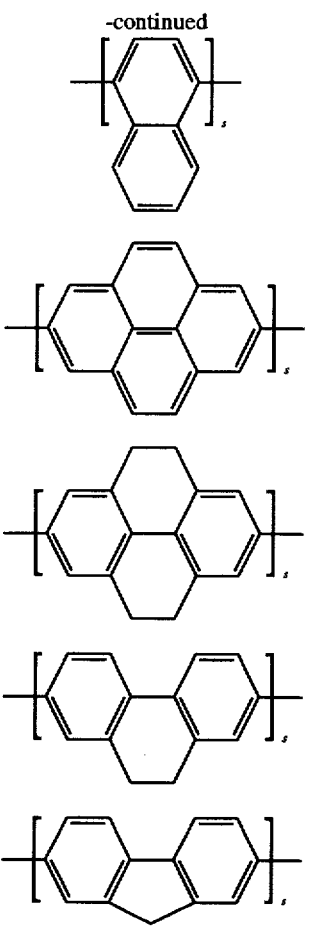

X, Y$^1$ are identical or different, and are H, Br, Cl, F, CN, NO$_2$, CF$_3$ or a straight-chain or branched alkyl group having from 1 to 22 carbon atoms, where one or more —CH$_2$— groups in the C$_1$-C$_{22}$ alkyl group can be replaced by —O—, —CO—O—, —O—CO— and one or more hydrogen atoms in the C$_1$-C$_{22}$ alkyl group can be replaced by F; or

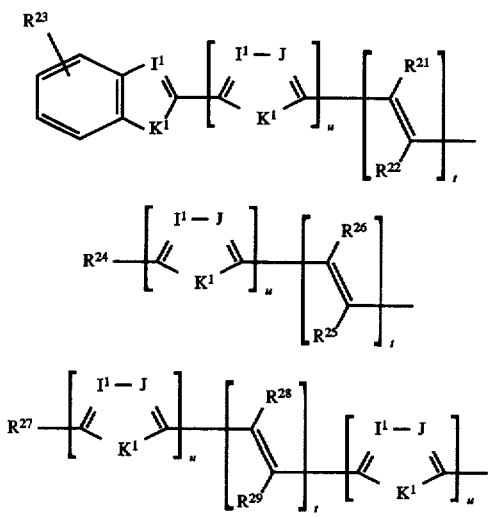

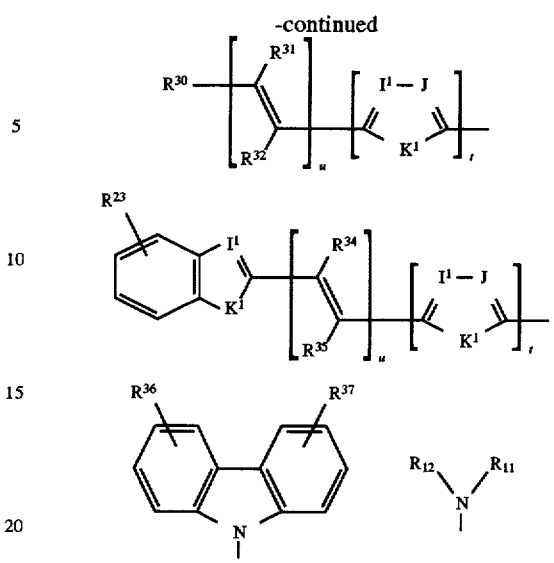

I$^1$, J, L, M are identical or different, and are =CR$^{38}$— or =N—;

K$^1$, N$^1$ are identical or different, and are —O—, —S—, CR$^{39}$R$^{40}$, —CR$^{41}$=CR$^{42}$—, —NR$^{43}$—, or —CR$^{44}$=N—;

R$^{16}$-r$^{42}$ are identical or different, and are, identical or different from R$^1$, as defined for R$^1$ in the formula (I);

R$^{43}$, R$^{44}$ are identical or different, and are, identical or different to R$^3$, as defined for R$^3$ in the formula (I);

q, r, s, t, u are identical or different, and are 0, 1, 2, 3, 4 or 5, with the abovementioned polymers being excepted.

12. An electroluminescence material comprising one or more polymers as claimed in claim 1.

13. An electroluminescence material comprising one or more polymers as claimed in claim 2.

14. An electroluminescence material comprising one or more polymers as claimed in claim 5.

15. An electroluminescence material, comprising one or more polymers as claimed in claim 9.

16. An electroluminescence material as claimed in claim 12, which is a light-emitting material, a charge transport material or a charge injection material.

17. A process for producing an electroluminescence material, which comprises the step of applying one or more polymers as claimed in claim 1 onto a substrate to form a film.

18. A process for producing an electroluminescence material, which comprises the step of applying one or more polymers as claimed in claim 3 onto a substrate to form a film.

19. An electroluminescence device comprising one or more active layers, wherein at least one of these layers comprises one or more polymers as claimed in claim 1.

20. An electroluminescence device comprising one or more active layers, wherein at least one of these layers comprises one or more polymers as claimed in claim 3.

* * * * *